US012557902B2

(12) United States Patent
   Liu

(10) Patent No.:  US 12,557,902 B2
(45) Date of Patent:  Feb. 24, 2026

(54) TOOTHBRUSH

(71) Applicant: Ken-Tu Liu, Taipei (TW)

(72) Inventor: Ken-Tu Liu, Taipei (TW)

( * ) Notice: Subject to any disclaimer, the term of this patent is extended or adjusted under 35 U.S.C. 154(b) by 402 days.

(21) Appl. No.: 18/356,644

(22) Filed: Jul. 21, 2023

(65) Prior Publication Data

US 2025/0024935 A1      Jan. 23, 2025

(51) Int. Cl.
   *A46B 9/04*        (2006.01)
   *A61C 17/22*       (2006.01)
   *A61C 17/34*       (2006.01)

(52) U.S. Cl.
   CPC ............ *A46B 9/045* (2013.01); *A61C 17/221* (2013.01); *A61C 17/222* (2013.01); *A61C 17/225* (2013.01); *A61C 17/349* (2013.01)

(58) Field of Classification Search
   CPC ......... A46B 9/045; A46B 9/026; A46B 15/00; A46B 5/0091; A61C 17/349; A61C 17/3445; A61C 17/3427
   See application file for complete search history.

(56) References Cited

U.S. PATENT DOCUMENTS

| | | | |
|---|---|---|---|
| 4,223,417 A | * | 9/1980 | Solow .................... A46B 9/045 |
| | | | 15/22.1 |
| 9,198,505 B1 | * | 12/2015 | Brar ........................ A46B 9/045 |
| 10,856,649 B2 | | 12/2020 | Kawabata et al. |
| 11,317,707 B2 | | 5/2022 | Castaldo |

FOREIGN PATENT DOCUMENTS

| | | | | |
|---|---|---|---|---|
| TW | | 547036 | 8/2003 | |
| TW | | M242187 | 9/2004 | |
| TW | | M264921 | 5/2005 | |
| WO | WO-2019026020 A1 | * | 2/2019 | ............. A46B 9/045 |

* cited by examiner

*Primary Examiner* — Shay Karls
(74) *Attorney, Agent, or Firm* — Withrow + Terranova, PLLC; Vincent K. Gustafson

(57)            ABSTRACT

A toothbrush includes a shell, a driving mechanism and a turning-and-moving mechanism mounted in the shell, and a brush connected to the turning-and-moving mechanism. The brush includes a main-brush and side-brushes mounted respectively on both sides of the main-brush. With the structure of the brush, the brush is capable of simultaneously brushing the inner side surfaces, the outer side surfaces, and the top surfaces of the teeth. With the turning-and-moving mechanism and the driving mechanism, the brush can move back and forth linearly and adjust the overall direction and the moving direction of the brush depending on orientations of teeth. The brush can accommodate various sizes and shapes of the teeth and the brush can adapt to the arrangement of the teeth in the dental arch.

10 Claims, 15 Drawing Sheets

TOOTHBRUSH

BACKGROUND OF THE INVENTION

1. Field of the Invention

The present invention relates to a toothbrush, and more particularly to a toothbrush for cleaning teeth.

2. Description of the Prior Art

For oral hygiene, people typically grip a toothbrush and manually move it in an axial or radial direction relative to the teeth, repeatedly. By doing so, the tufts of bristles at the end of the toothbrush are capable of cleaning surfaces of the teeth.

In order to enhance the convenience of oral hygiene, an electric toothbrush has been introduced in the market. This electric toothbrush can control the rotation of the tufts of bristles to remove plaque from the surfaces of the teeth by a drive motor. Users only need to adjust the grip direction and the position of this electric toothbrush to clean the teeth instead of repeatedly moving toothbrush in the axial or radial direction.

Currently, when users are cleaning teeth, whether using a traditional toothbrush or a commercially available electric toothbrush, users have to constantly and largely change the grip direction of the toothbrush to effectively clean the inner side surface, the outer side surface, and the top surface of each tooth.

However, in long-term care facilities, when caregivers assist care recipients in oral hygiene, they have to grip a toothbrush or an electric toothbrush and try to clean the care recipients' teeth from various angles. The current tooth-brushes are inconvenient in operation, and also there are potentially unreachable blind spots hardly cleaned.

To overcome the shortcomings, the present invention provides a toothbrush to mitigate or obviate the aforementioned problems.

SUMMARY OF THE INVENTION

The main objective of the present toothbrush is to reduce an inconvenience in use that users have to constantly and largely change the grip direction of the traditional tooth-brush or the electric toothbrushes, thereby effectively cleaning the inner side surface, the outer side surface, and the top surface of each tooth, and cleaning the potentially unreachable blind spots that are hard to clean. The design of this brush is based on the size and shape of the teeth and also takes the arrangement of the teeth in the dental arch into consideration. Specifically, the innovative design has specialized functions that the brushes of this toothbrush can accommodate various sizes and shapes of the teeth and can follow the arrangement of the teeth in the dental arch.

The toothbrush includes a shell a driving mechanism, a turning-and-moving mechanism, and a brush. The shell has a grip part and a brush end. The brush end extends from an end of the grip part. The driving mechanism is mounted in the grip part of the shell and has a drive motor, a power supply module, and a control module. The power supply module is electrically connected to the drive motor and capable of providing working power to the drive motor. The control module is electrically connected to the drive motor and capable of controlling the drive motor to rotate or not. The turning-and-moving mechanism is mounted in the brush end of the shell. The turning-and-moving mechanism is connected to and controlled by the drive motor.

The brush defines a cleaning space, the brush includes a main-brush and two side-brushes surrounding the cleaning space. The main-brush includes a brush and a main-brush head. The brush connector is connected to the turning-and-moving mechanism. The main-brush head is connected to the brush connector. Each one of the side-brushes includes a connecting component, a side-brush head, and an elastic component. The connecting components of the two side-brushes are pivotally mounted on two opposite sides of the main-brush head. The side-brush head is pivotally mounted on an end of the connecting component. The elastic component is mounted in the connecting component and the main-brush head. Each one of the main-brush head and the two side-brush heads forms multiple tufts of bristles oriented towards the cleaning space. Wherein the turning-and-moving mechanism is capable of driving the brush to move back and forth linearly along a brushing path, and changing an orientation of the brush and a direction of the brushing path.

The cleaning space defined by the brush allows users to put their teeth in. If the user does so, the tufts of bristles of the main-brush and the tufts of bristles of the two side-brushes will contact the inner side surfaces, the outer side surfaces, and the top surfaces of the teeth. The brush can move back and forth linearly to facilitate cleaning the tooth surfaces by being driven by the turning-and-moving mechanism in conjunction with the driving mechanism.

Wherein, when cleaning the anterior teeth, such as the incisors or canines located at the front of the mouth, the two side-brushes enable the tufts of bristles of the two side-brushes to contact the inner and outer sides of the teeth, respectively. When cleaning the posterior teeth, such as molars located at the back of the mouth, the user can apply force to drive the brush to move along the direction of the teeth. At this moment, the brush is pushed by the resistance of the tooth during moving. The turning-and-moving mechanism can change the direction of the brush and the direction of the brushing path. The two side-brushes of the brush will spread out along the shapes of the teeth by the elasticity of the elastic component. The tufts of bristles of the main-brush can rest against the inner side surface, the outer side surface, and the top surface of the teeth in the cleaning process. Thereby this toothbrush enables the user to effectively clean the teeth without significantly adjusting the grip direction, and enhances user convenience in cleaning the teeth.

The toothbrush as mentioned above, wherein the turning-and-moving mechanism includes a transmission wheel assembly and a turning wheel. The transmission wheel assembly has a transmission shaft rod and a driven wheel. The transmission shaft rod is connected to the drive motor and capable of rotating along a transmission axis. The driven wheel is pivotally mounted on the brush end and engaged with the transmission shaft rod, the driven wheel rotates along a pivot axis and forms a pivot pin deviating from the pivot axis.

The turning wheel is pivotally mounted in the brush end of the shell and elastically engaged with an elastic protruding buckle of the inner side of the brush end. The turning wheel has a guide groove laterally extending and a mating hole connecting to the guide groove, wherein the brush connector is mounted in the guide groove and capable of moving along the brushing path. The brushing path is parallel with an extending direction of the guide groove. The brush connector has a mating slot being perpendicular to the extending direction of the guide groove. Wherein the pivot pin passes through the mating hole of the turning wheel and extends in the mating slot of the brush connector.

Thereby the drive motor drives the driven wheel to rotate by the transmission shaft rod, enabling the pivot pin of the driven wheel to do circular motion in the mating hole of the turning wheel and driving the brush connector at the same time. The brush connector will move back and forth linearly along the brushing path as being limited to its position by the guide groove of the turning wheel.

In addition, the turning wheel is pivotally mounted in the brush end of the shell, and elastically engaged with an elastic protruding buckle of the inner side of the brush end. Thereby the turning wheel enables the brush to turn under user's pushing, and the brushing of the brush to changes the direction in accordance with the orientations of the teeth.

Other objectives, advantages and novel features of the invention will become more apparent from the following detailed description when taken in conjunction with the accompanying drawings.

DETAILED DESCRIPTION OF THE PREFERRED EMBODIMENTS

FIGS. 1 to 4 are preferred embodiments in the present invention. The toothbrush includes a shell 10, a driving mechanism 20, a turning-and-moving mechanism 30, and a brush 40.

Figure 1:
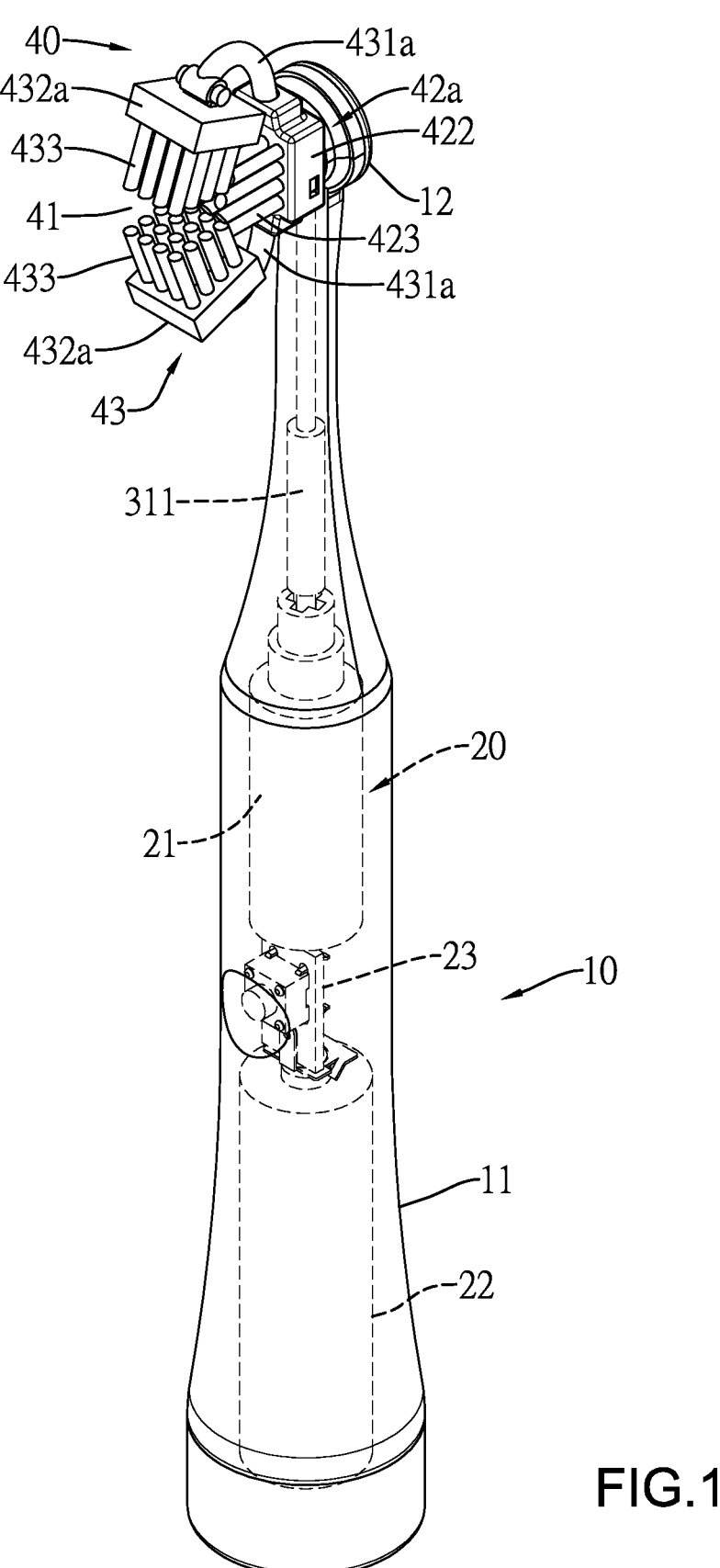
FIG. 1 is a perspective view of a first preferred embodiment in accordance with the present invention.
Figure 3:
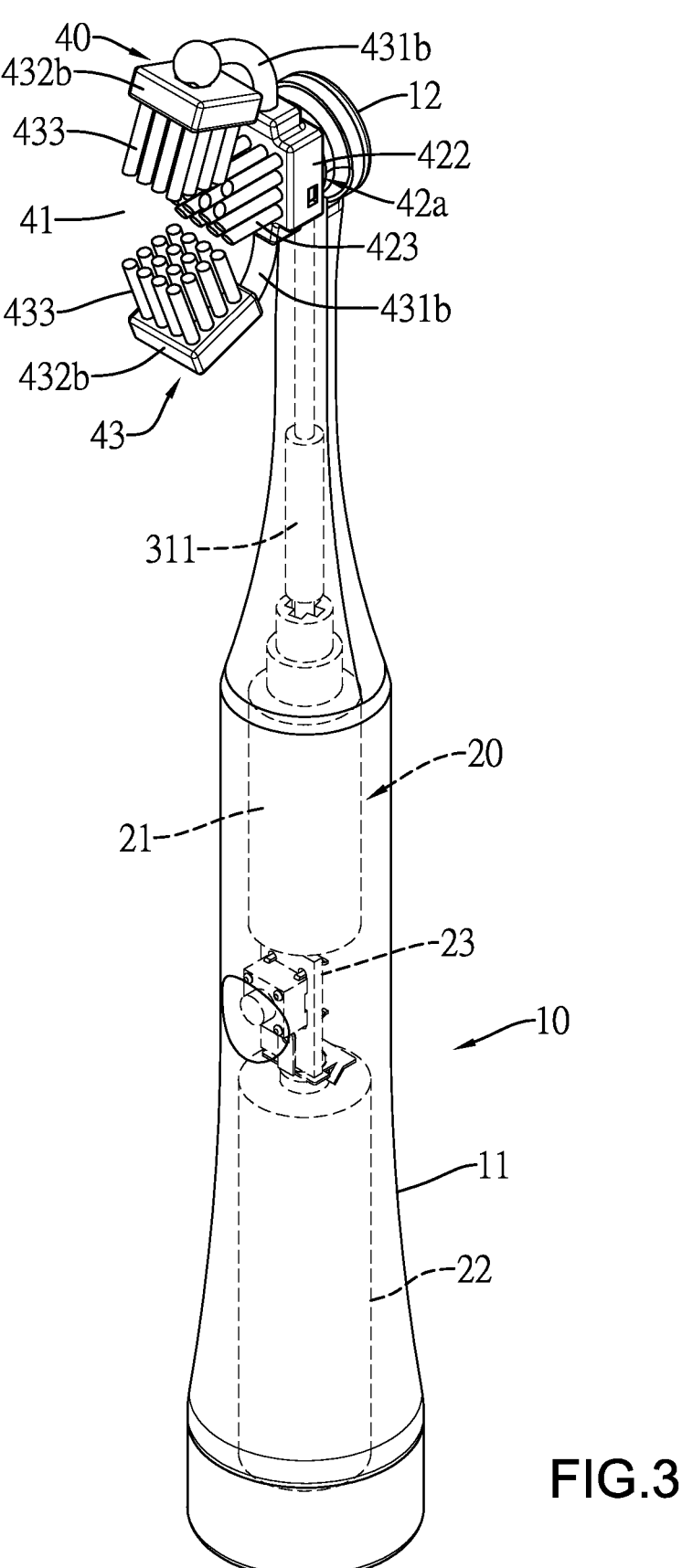
FIG. 3 is a perspective view of a second preferred embodiment in accordance with the present invention.

With reference to FIGS. 1 and 3, the shell 10 has a grip part 11 and a brush end 12 extending from one end of the grip part 11.

With reference to FIGS. 1 and 3, the driving mechanism 20 is mounted in the grip part 11 of the shell 10. The driving mechanism 20 has a drive motor 21, a power supply module 22, and a control module 23. The power supply module 22 and the control module 23 are electrically connected to the drive motor 21. The power supply module 22 is configured to supply working power to the drive motor, and the control module 23 is capable of controlling the drive motor 21 to rotate or not.

With reference to FIGS. 1 to 4, the turning-and-moving mechanism 30 is mounted in the brush end 12 of the shell 10. The turning-and-moving mechanism 30 is connected to and controlled by the drive motor 21.

With reference to FIGS. 1 to 5, and 7, the brush 40 defines a cleaning space 41. The brush 40 includes a main-brush 42a/42b and two side-brushes 43 surrounding the cleaning space 41. The main-brush 42a/42b includes a brush connector 421 and a main-brush head 422. The brush connector 421 is connected to the turning-and-moving mechanism 30. The main-brush head 422 is detachably connected to the brush connector 421.

Each one of the side-brushes 43 includes a connecting component 431a/431b and a side-brush head 432a/432b. The connecting components 431a/431b of the two side-brushes 43 are pivotally mounted on the opposite sides of the main-brush head 422. An elastic component 44 is mounted in the connecting component 431a/431b and the main-brush head 422. The two side-brush heads 432a/432b are pivotally mounted on an end of the connecting component 431a/431b, respectively. The main-brush head 422 has multiple tufts of bristles 423 formed thereon and the two side-brush heads 432a/432b has multiple tufts of bristles 433 thereon. The tufts of bristles 423, 433 are oriented towards the cleaning space 41. With reference to FIGS. 8 to 11, the turning-and-moving mechanism 30 is capable of driving the brush 40 to move back and forth linearly along a brushing path, and changing the orientation of the brush 40 and the direction of the brushing path.

Figure 4:
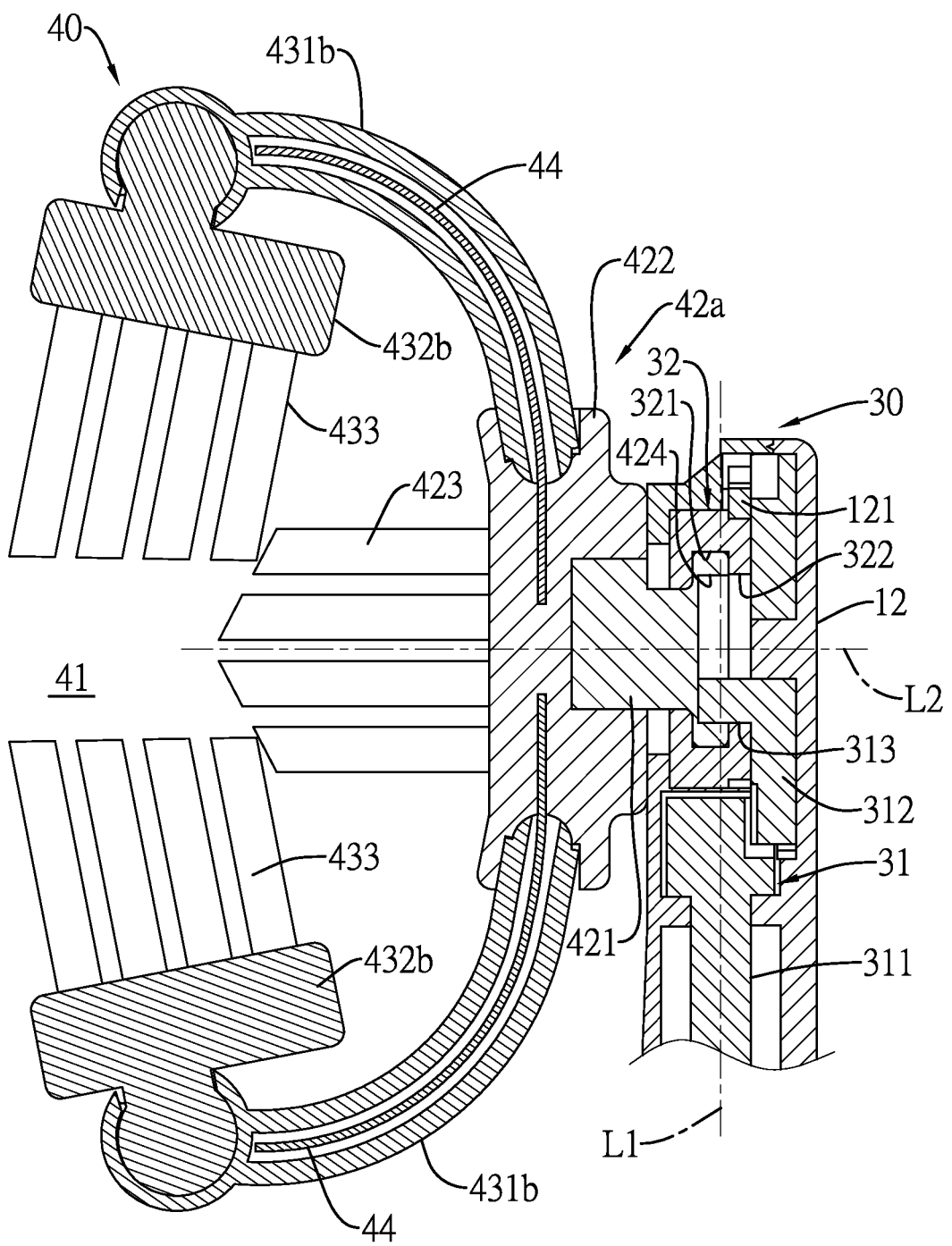
FIG. 4 is a cross sectional view in partial section of the second preferred embodiment in accordance with the present invention.
Figure 5:
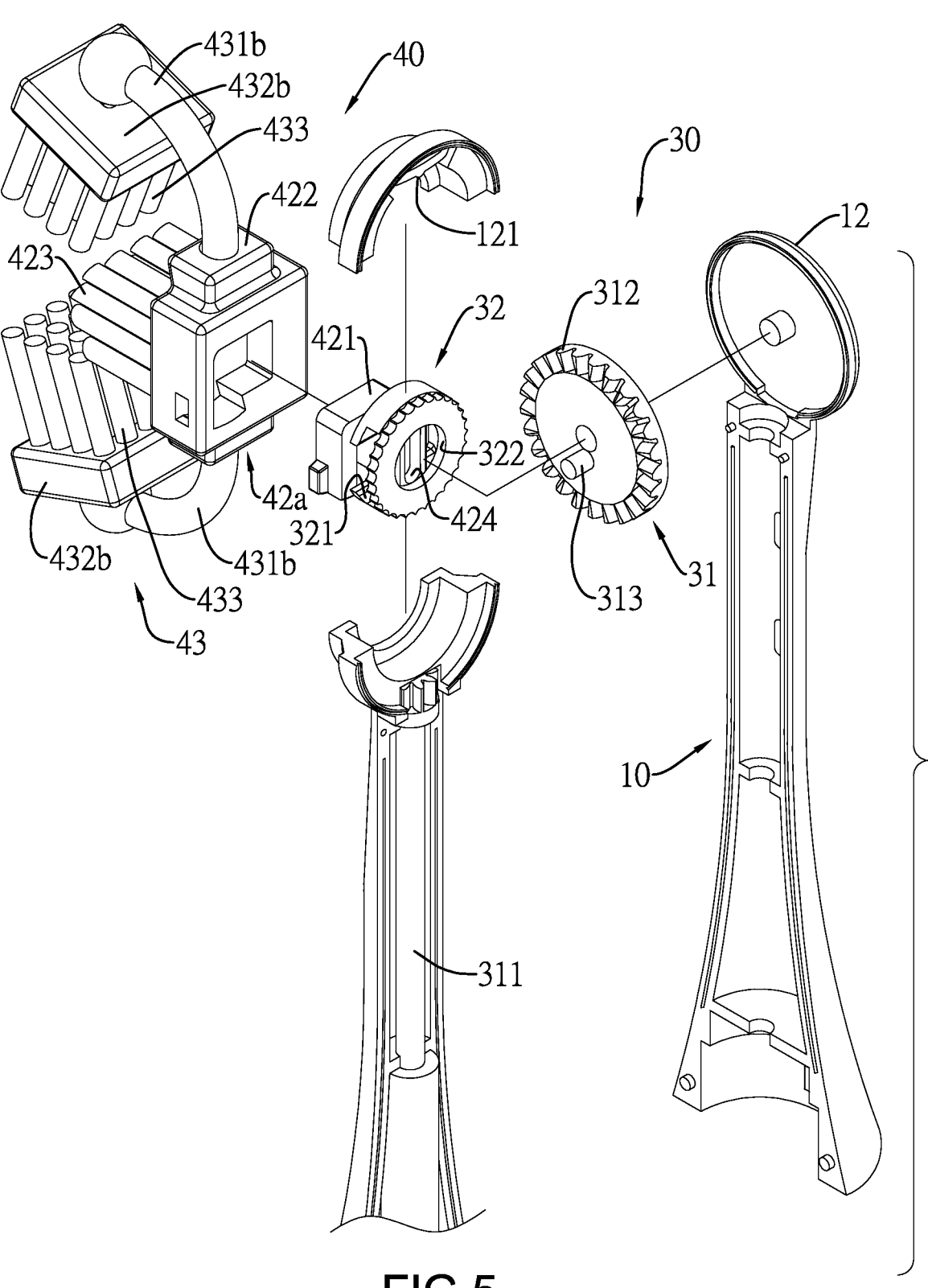
FIG. 5 is an exploded perspective view of the second preferred embodiment adopting the detachable main-brush in accordance with the present invention.
Figure 7:
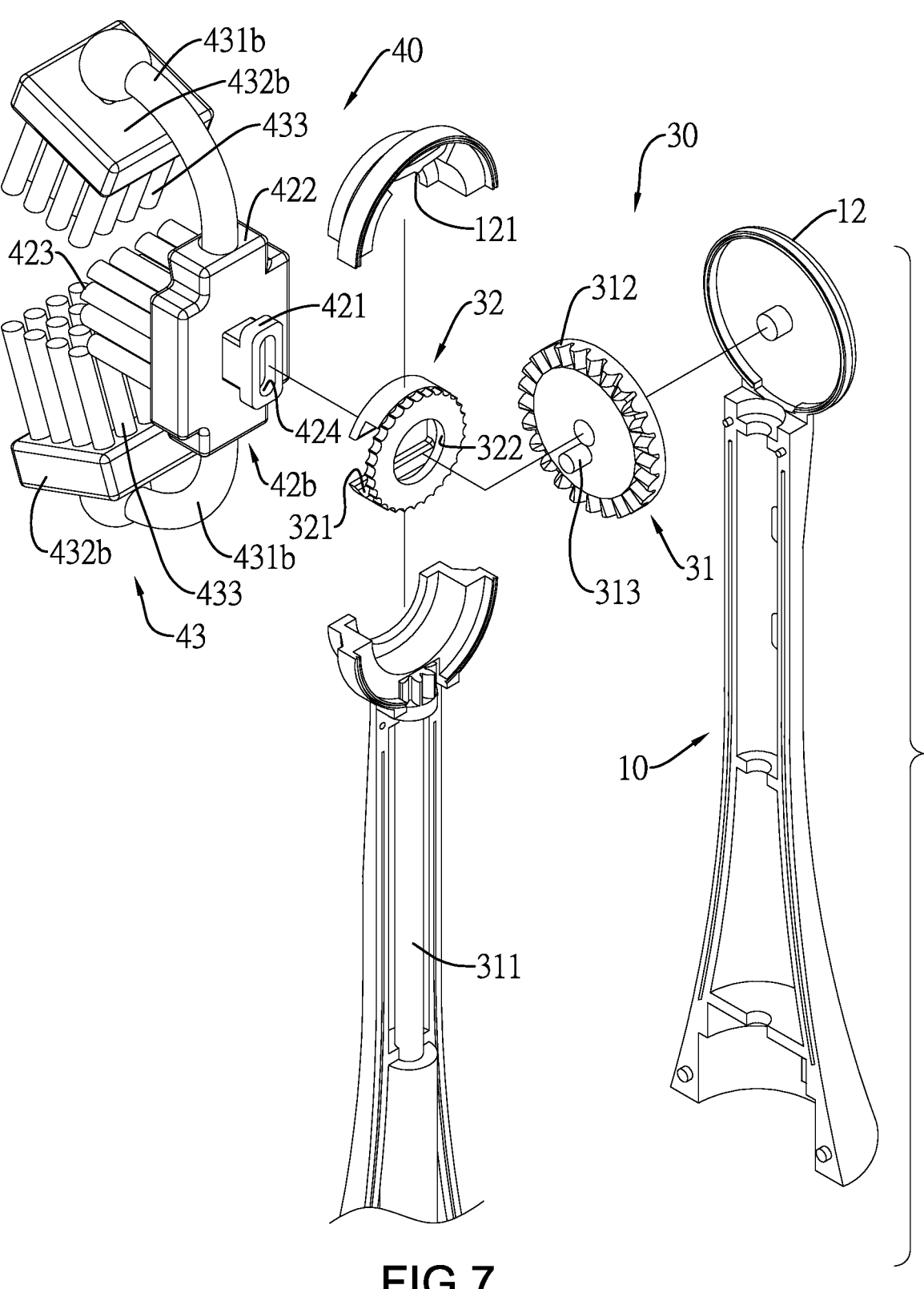
FIG. 7 is an exploded perspective view of the second preferred embodiment adopting the one-piece molded main-brush in accordance with the present invention.

With reference to FIGS. 4, 5, and 7, the transmission wheel assembly 30 has a transmission wheel assembly 31 and a turning wheel 32. The transmission wheel assembly 31 has a transmission shaft rod 311 and a driven wheel 312. The transmission shaft rod 311 is connected to the drive motor 21 and is capable of rotating along a transmission axis L1. The driven wheel 312 is pivotally mounted on the brush end 12, and the driven wheel 312 and the transmission shaft rod 311 are engaged. The driven wheel 312 rotates along a pivot axis L2. The driven wheel forms a pivot pin 313 deviating from the pivot axis L2.

With reference to FIGS. 4 to 7, the turning wheel 32 is pivotally mounted in the brush end 12 of the shell 10, and elastically engaged with an elastic protruding buckle 121 formed on an inner side of the brush end 12. The turning wheel 32 has a guide groove 321 laterally extending and a mating hole 322 connecting to the guide groove. The brush connector 421 is mounted in the guide groove 321 and is capable of moving along the brushing path. The brushing path is parallel with the extending direction of the guide groove 321. The brush connector 421 has a mating slot 424 being perpendicular to the extending direction of the guide groove 321. The pivot pin 313 of the driven wheel 312 passes through the mating hole 322 of the turning wheel 32 and extends in the mating slot 424 of the brush connector 424.

Figure 2:
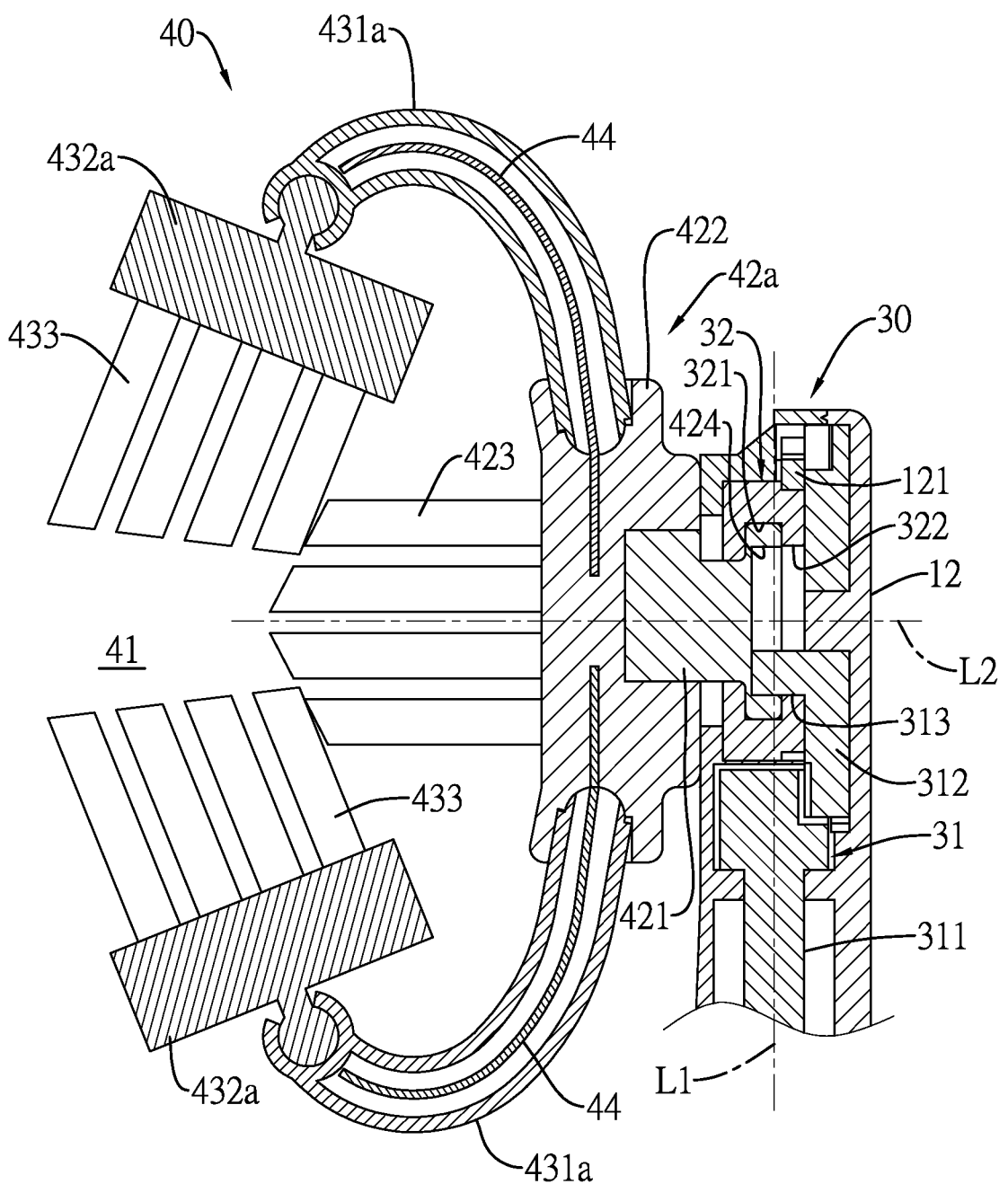
FIG. 2 is a cross sectional view in partial section of the first preferred embodiment in accordance with the present invention.

With reference to FIGS. 1 to 4, the connections between the connecting component 431a/431b and the side-brush head 432a/432b can be a pivot or a ball joint depending on need. With reference to FIGS. 1 and 2, in a first preferred embodiment, the connections between the connecting component 431a and the side-brush head 432a are a pivot and allows the side-brush head 432a to pivot relative to the connecting component 431a along the axis of the pivot.

With reference to FIGS. 3 and 4, in a second preferred embodiment, the connection between the connecting component 431b and the side-brush head 432b is a ball joint and allows the side-brush head 432b to rotate relative to the connecting component 431b in various directions. It is suitable for teeth with curved surfaces.

With reference to FIGS. 1 to 4, a tip of the main-brush head 422 is V-shaped, and lengths of the tufts of bristles 433 of the side-brush head 432a/432b gradually increase in a direction away from the main-brush head 422. This toothbrush can be used by users for oral self-care or by caregivers in long-term care facilities to assist the care recipients in oral hygiene. The following description is based on the second preferred embodiment in accordance with the present invention.

With reference to FIGS. 3 to 5, 7, and 8, when using this toothbrush, the user can turn on the drive motor 21 by operating the control module 23 of the driving mechanism 20. If do so, the drive motor 21 will drive the transmission shaft rod 311 to rotate along the transmission axis L1. During the rotation of the driven wheel 312, the pivot pin 313 of the driven wheel 312 deviating from the pivot axis L2 performs a circular motion about the pivot axis L2 in the mating hole 322 of the turning wheel 32.

Figure 8:
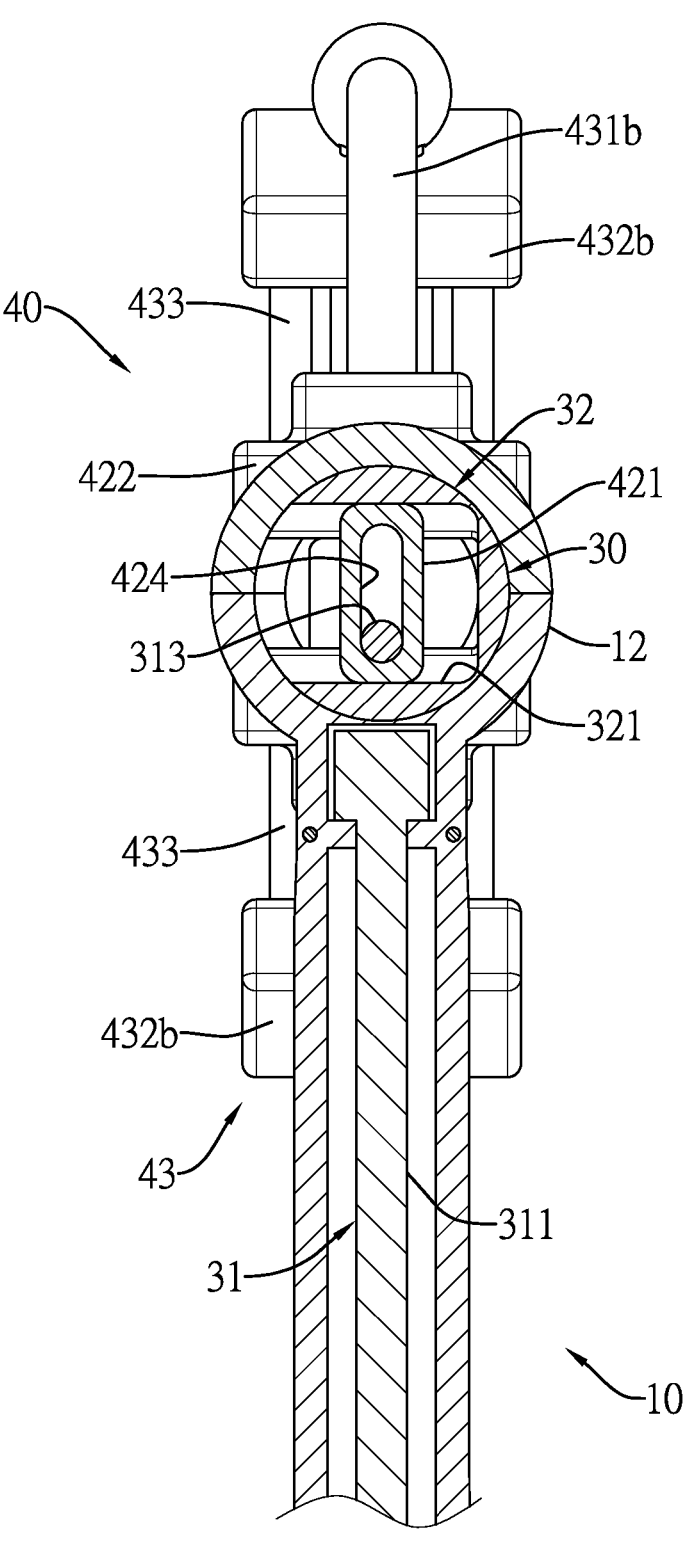
FIG. 8 is a cross sectional view in partial section of the brush end, the turning-and-moving mechanism, and the brush connector of the second preferred embodiment in accordance with the present invention.
Figure 9:
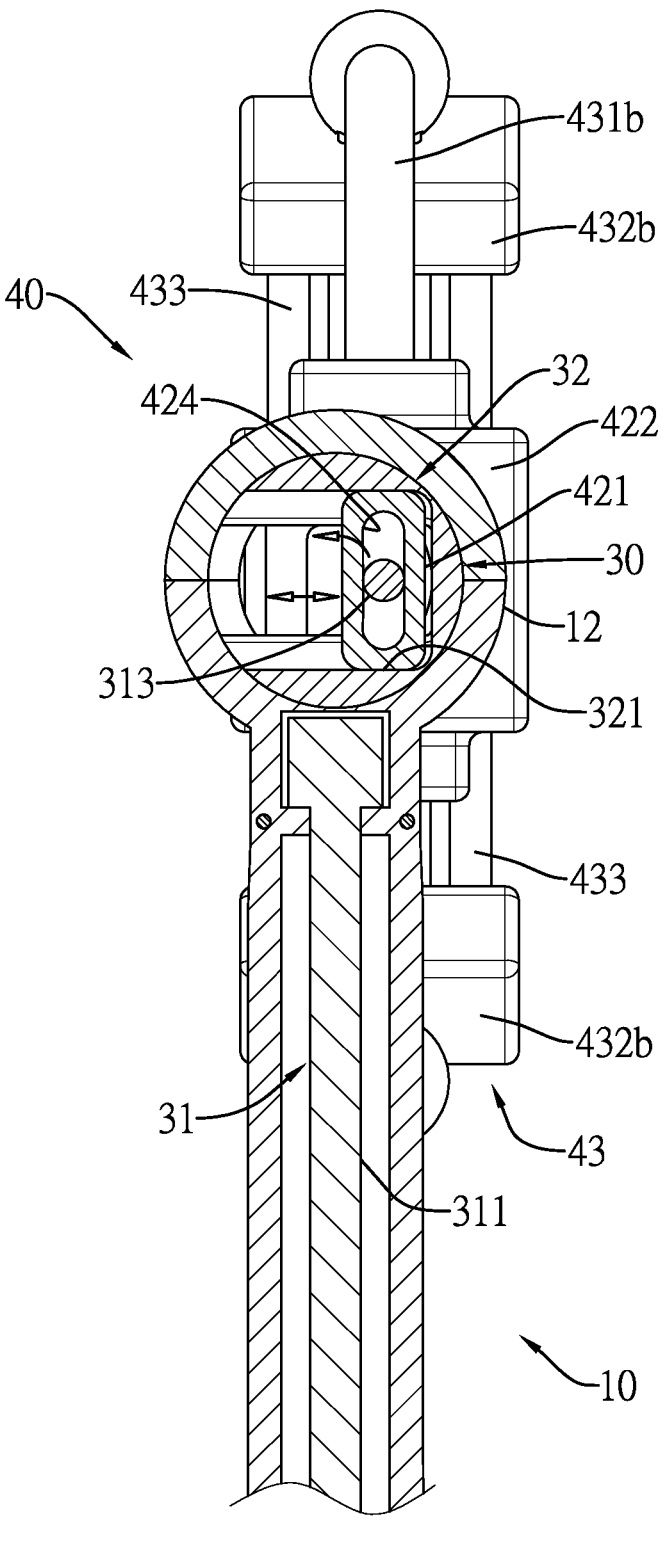
FIG. 9 is a schematic view showing the movement of the brush of the second preferred embodiment in accordance with the present invention.

With reference to FIGS. 8 and 9, the pivot pin 313 extends into the mating slot 424 of the brush connector 421. The brush connector 421 moves along the extending direction of the guide groove 321 of the turning wheel 32. Therefore, during the circular motion of the pivot pin 313, the brush connector 421 is limited to its position by the guide groove 321 of the turning wheel 32, and the whole brush 40 moves back and forth linearly along the brushing path.

Figure 10:
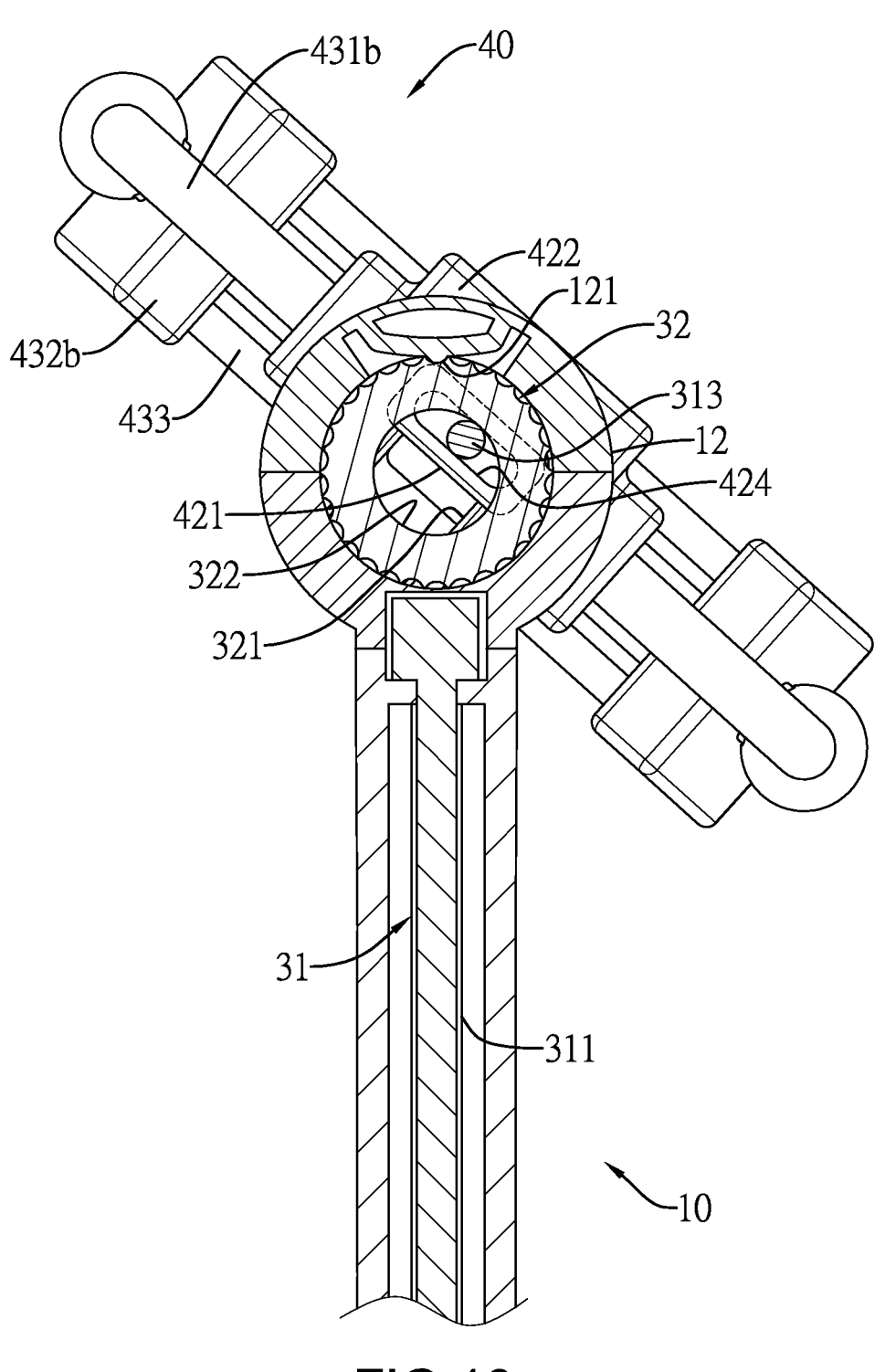
FIG. 10 is a first schematic view showing the turning of the turning wheel and the brush of the second preferred embodiment in accordance with the present invention.
Figure 11:
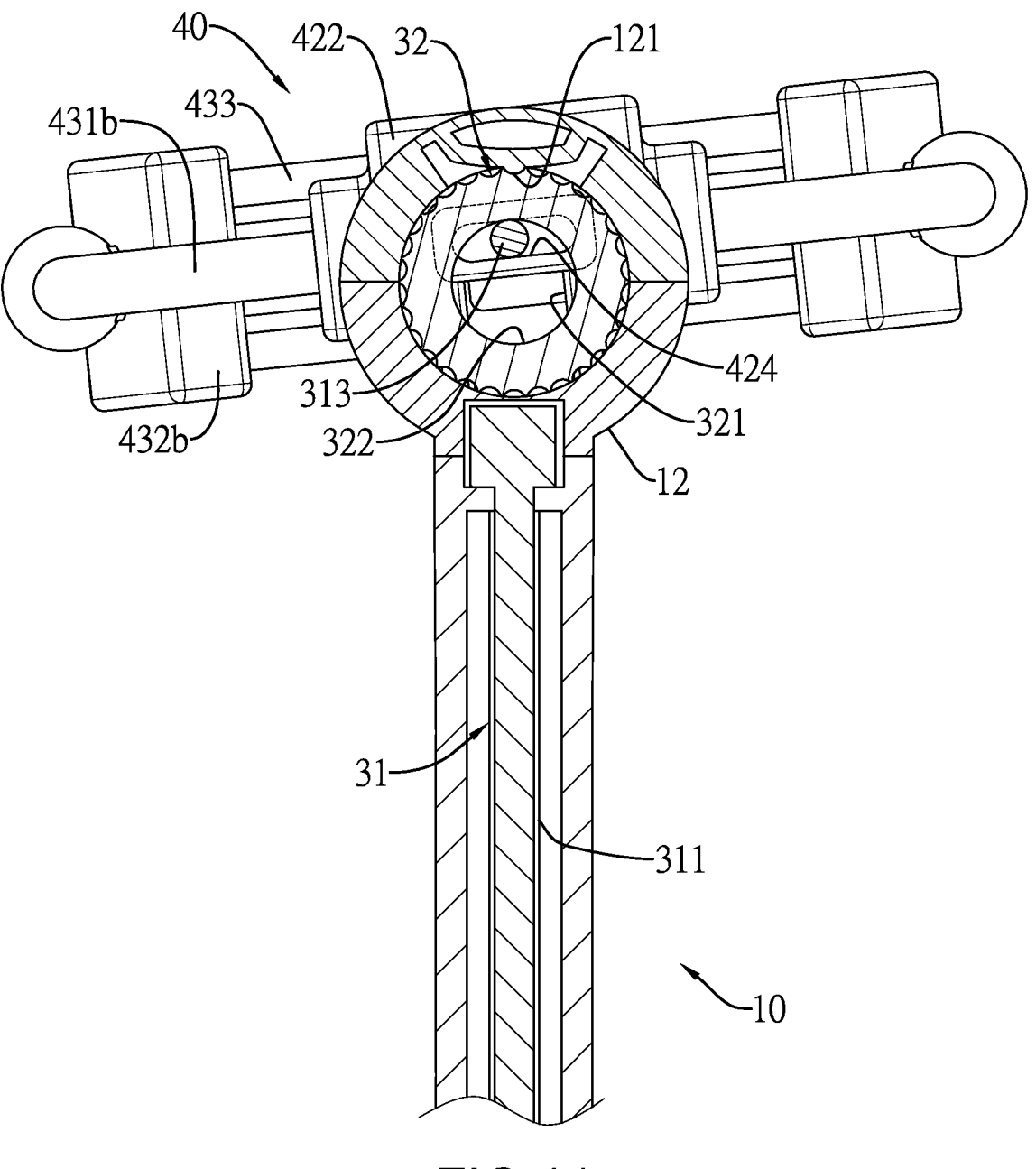
FIG. 11 is a second schematic view showing the turning wheel and the brush of the second preferred embodiment turning in accordance with the present invention.
Figure 12:
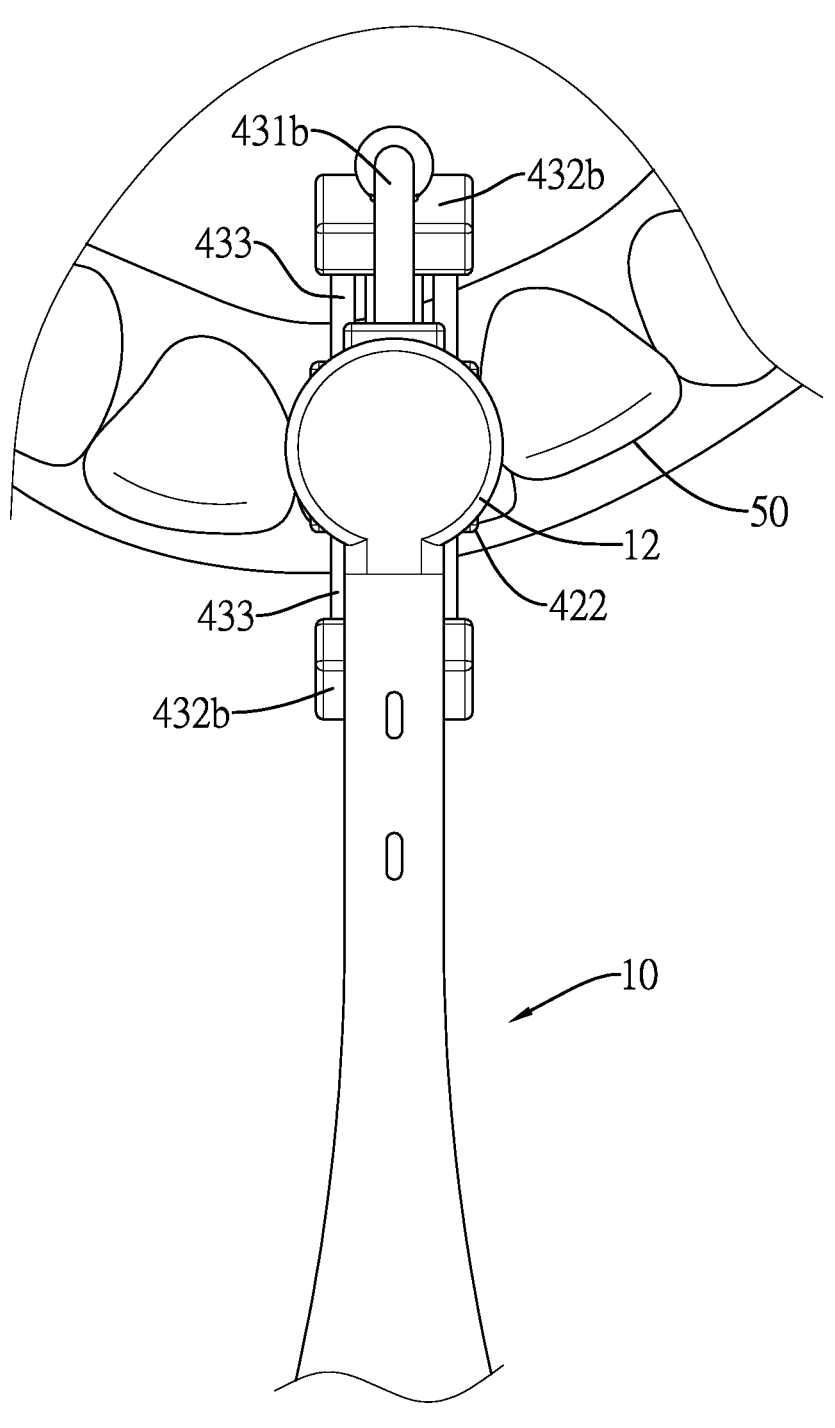
FIG. 12 is a top view showing the anterior teeth being cleaned by the second preferred embodiment in accordance with the present invention.

With reference to FIGS. 10 and 11, when the turning wheel 32 of the turning-and-moving mechanism 30 is pushed by external force, the turning wheel 32 rotates in the brush end 12 of the shell 10. While rotating, the turning wheel 32 will change the direction of the guide groove 321, thereby changing the direction of the brush 40 and the direction of the brushing path. The elastic protruding buckle 121 is elastically engaged with the turning wheel 32 and can provide a certain level of rotational resistance, thereby limiting the turning wheel 32 not to deviate during the linearly back-and-forth movement of the brush 40.

With reference to FIGS. 12 to 15, when cleaning teeth by the present toothbrush, the user can move the brush 40 to the teeth that need cleaning, and place the teeth in the cleaning space 41 of the brush 40. At this moment, the tufts of bristles 423 of the main-brush 42a and the tufts of bristles 433 of the two side-brushes 43 contact the inner side surfaces, the outer side surfaces, and the top surfaces of the teeth. The brush 40 can move back and forth linearly by being driven by the cooperation between the turning-and-moving mechanism 30 and the driving mechanism 20. The tufts of bristles 423 of the main-brush 42a and the tufts of bristles 433 of the two side-brushes 43 can move back and forth along the brushing path, thereby removing plaque from the inner side surfaces, the outer side surfaces, and the top surfaces of the teeth.

With reference to FIGS. 12 to 15, the user can move the brush 40 connecting the brush end 12 along a direction of the tooth arrangement by gripping the grip part 11. The two side-brushes 43 of the brush 40 will drive the turning wheel 32 to rotate by being guided by the tooth alignment, thereby changing the orientation of the brush 40 and the direction of the brushing path. Therefore, the two side-brushes 43 can maintain their positions on the inner and outer sides of the teeth, and the brushing path can change its direction with the tooth orientation.

Figure 13:
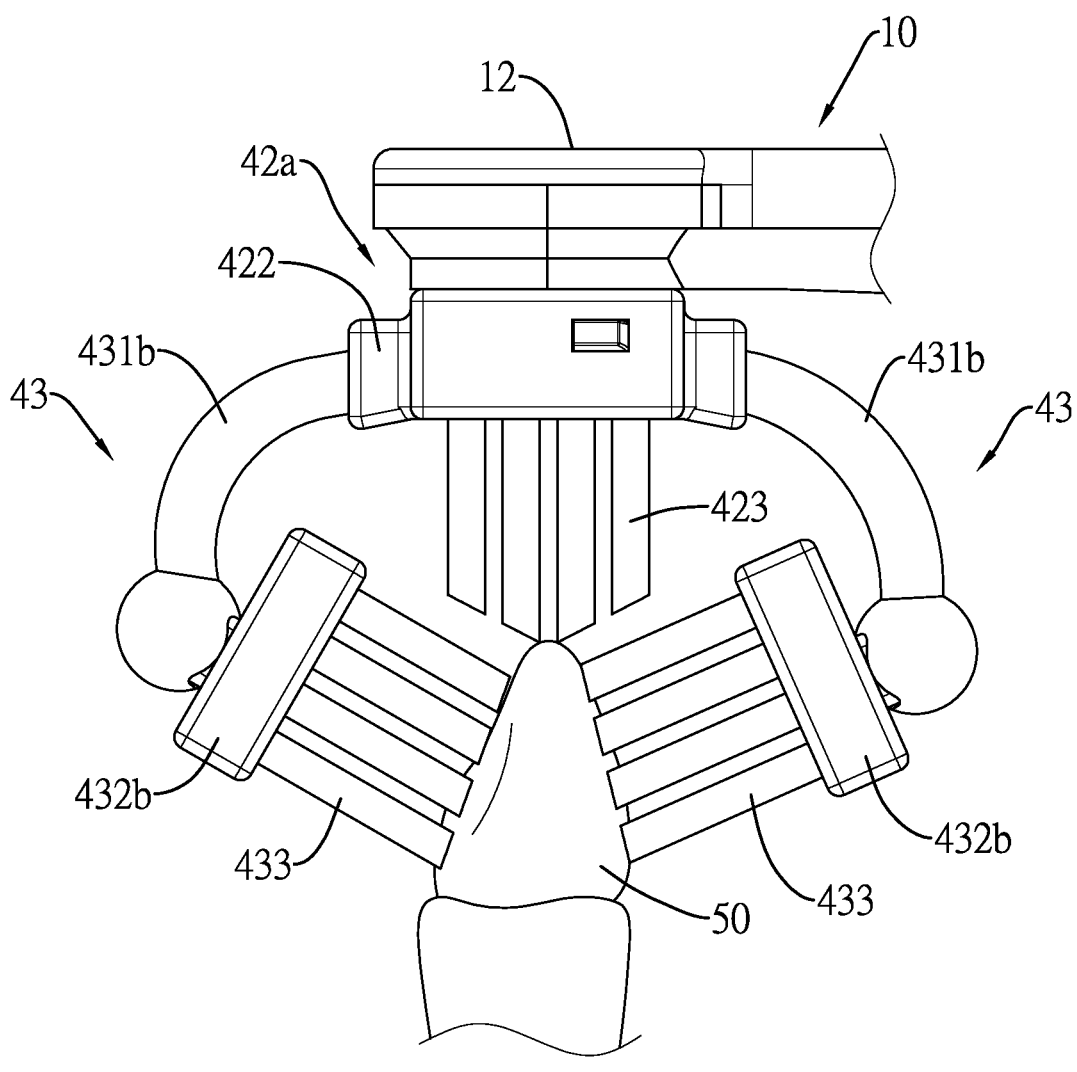
FIG. 13 is a side view showing the anterior teeth being cleaned by the second preferred embodiment in accordance with the present invention.
Figure 14:
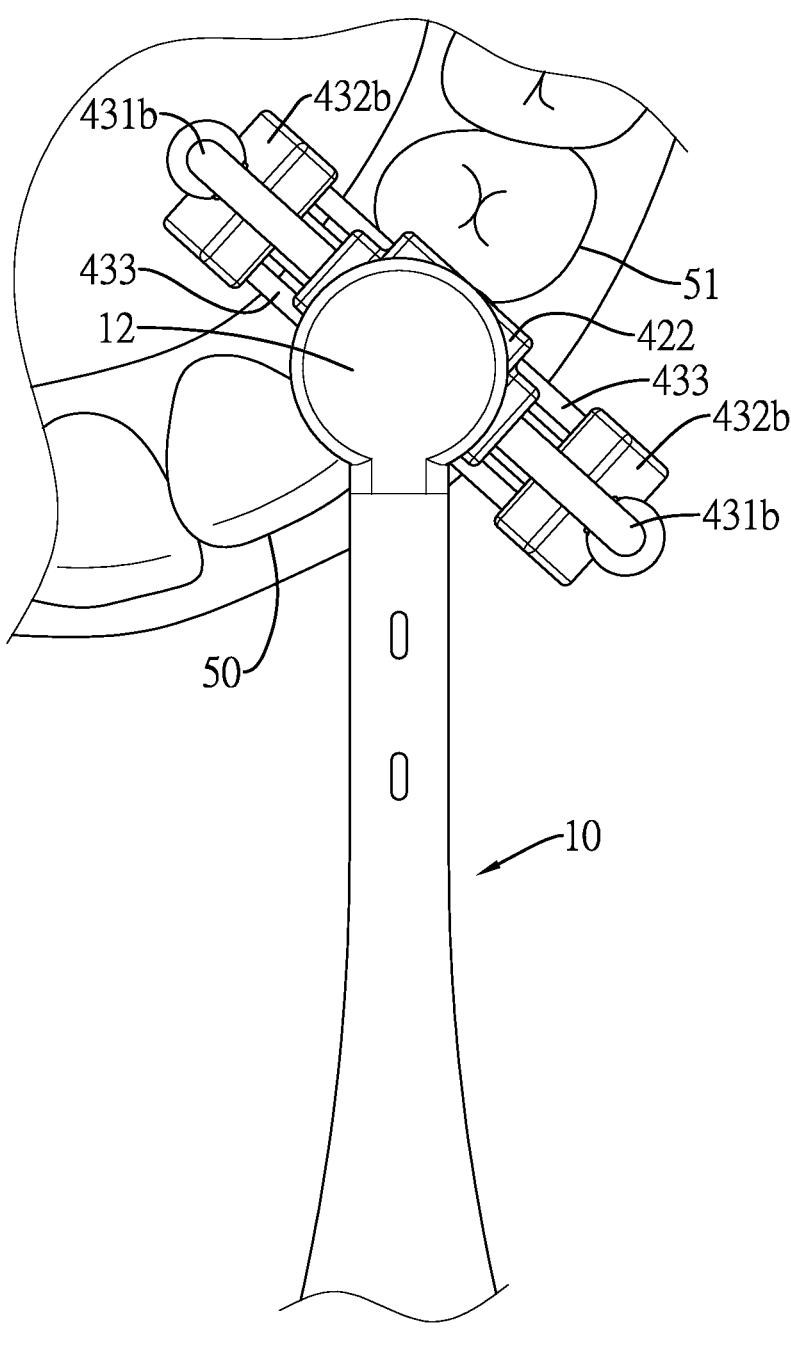
FIG. 14 is a top view showing the posterior teeth being cleaned by the second preferred embodiment in accordance with the present invention.
Figure 15:
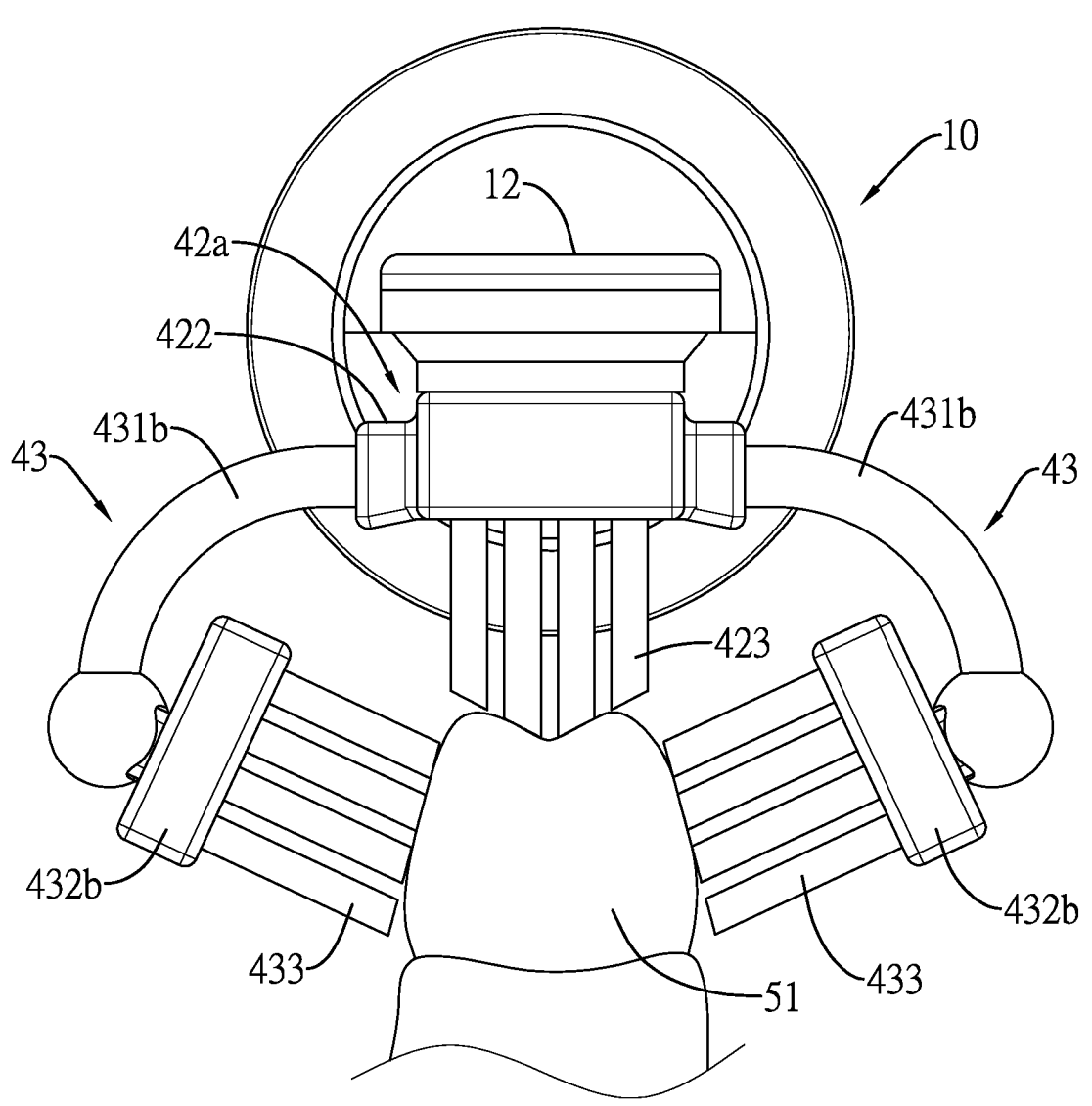
FIG. 15 is a top view showing the posterior teeth being cleaned by the second preferred embodiment in accordance with the present invention.

With reference to FIGS. 13 and 15, the brush 40 allows the side-brush heads 432b of the two side-brushes 43 to make minor adjustments to the angle of the tufts of bristles 433 in accordance with the different teeth appearance by the connecting component 431b and the pivotal connection between the main-brush head 422 and the side-brush head 432b. Moreover, because of the elasticity of the inner elastic component 44, the tufts of bristles 433 of the side-brush heads 432b can provide a sufficient clamping force during tooth cleaning, ensuring that the tufts of bristles 433 can contact the inner and outer sides of each tooth.

For example, with reference to FIG. 13, when cleaning the anterior teeth 50, such as the incisors or canines located at the front of the mouth, the two connecting components 431b can pivot downward relative to the main-brush head 422 under the elastic force of the elastic component 44 and the two side-brushes 43 can move to each other by being driven by the two connecting components 431b because of the elastic component 44 mounted in the two connecting components 431b and the main-brush head 422. Moreover, the two side-brushes 43 can rotate relative to the surface of the anterior teeth 50 by the pivotal connections between the connecting component 431b and the side-brushes 43. The tufts of bristles 433 of the two side-brushes 43 can tightly contact the inner and outer sides of the teeth respectively, such that the cleaning space 41 forms an inverted V-shaped triangle.

With reference to FIG. 15, when cleaning the posterior teeth 51, such as molars located at the back of the mouth, the user can apply force to drive the brush 40 to move along the direction of the tooth alignment. The two side-brushes 43 of the brush 40 will spread out along the contours of the teeth. The tufts of bristles 423 of the main-brush 42b can rest against the top surface of the posterior teeth 51. The two connecting components 431b can pivot upward relative to the main-brush head 422. At the same time, the elasticity of the elastic component 44 provides sufficient clamping force to the two side-brushes 43, and the pivotal connections between the connecting component 431b and the side-brushes 43 rotate relative to the surfaces of the posterior teeth 51. The tufts of bristles 433 of the two side-brushes 43 can tightly contact the inner and the outer sides of the teeth by the clamping force and the rotation, thereby making the cleaning space an M-shaped quadrangular.

Figure 6:
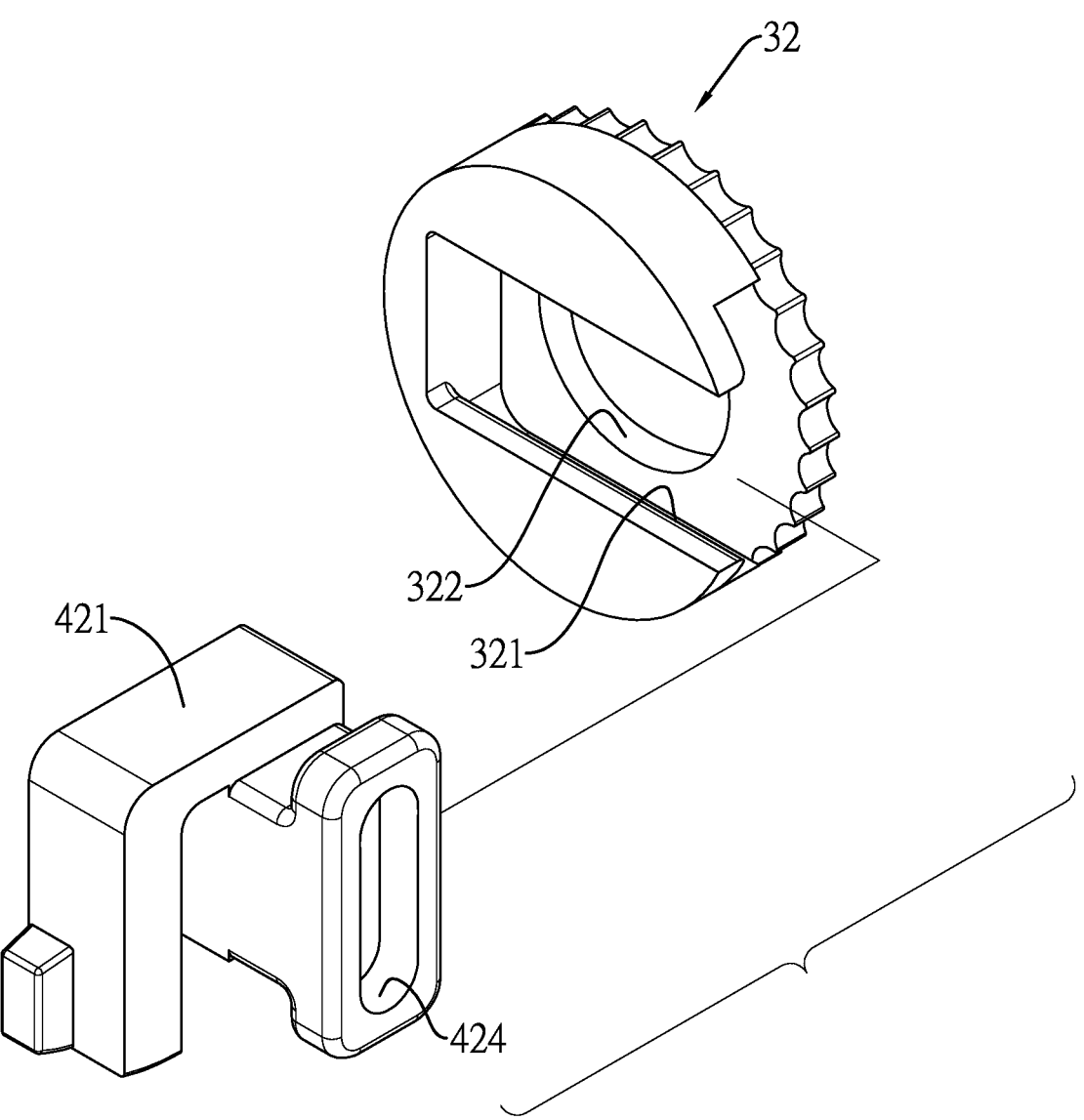
FIG. 6 is an exploded perspective view of the turning wheel and the brush connector in FIG. 5.

Moreover, with reference to FIG. 6, the brush connector 421 of the main-brush 42a can be detachable from the main-brush head 422. Therefore, user can separate the main-brush head 422 from the brush connector 421 and replace the main-brush head 422 and the side-brush heads 432a/432b instead of replacing the whole toothbrush. Therefore, this toothbrush can lower the replacement cost effectively, and enhance health and safety by regularly replacing the main-brush head 422 and the side-brush heads 432a/432b. In addition, with reference to FIG. 7, the brush connector 421 of the main-brush 42b can connect to the main-brush head 422 with one-piece formation.

In conclusion, according to the structural design of the brush 40, the brush 40 is capable of simultaneously cleaning the inner side surfaces, the outer side surfaces, and the top surfaces of the teeth. The brush 40 can be in conjunction with the turning-and-moving mechanism 30 and the driving mechanism 20 to move back and forth linearly and adjust the overall direction and the moving direction of the brush 40 in accordance with the arrangement of the teeth. As a result, users can effectively clean the inner side surface, the outer side surface, and the top surface of each tooth without adjusting the direction of toothbrush significantly. This toothbrush can greatly enhance user convenience and cleaning effectiveness.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A toothbrush including:
a shell having:
    a grip part; and
    a brush end extending from an end of the grip part;
a driving mechanism mounted in the grip part of the shell;
    the driving mechanism having:
    a drive motor;
    a power supply module electrically connected to the drive motor and being capable of providing working power to the drive motor; and
    a control module electrically connected to the drive motor and being capable of controlling the drive motor to rotate or not;
a turning-and-moving mechanism mounted in the brush end of the shell, the turning-and-moving mechanism connected to and controlled by the drive motor; and
a brush defining a cleaning space; the brush including:
    a main-brush and two side-brushes surrounding the cleaning space;
    wherein the main-brush includes:
      a brush connector connected to the turning-and-moving mechanism; and
      a main-brush head connected to the brush connector;
    wherein each one of the side-brushes includes:
      a connecting component, the connecting components of the two side-brushes pivotally mounted on two opposite sides of the main-brush head; and
      a side-brush head pivotally mounted on an end of the connecting component;
      an elastic component mounted in the connecting component and the main-brush head;
    wherein each one of the main-brush head and the two side-brush heads forms:

multiple tufts of bristles oriented towards the cleaning space;
    wherein the turning-and-moving mechanism is capable of driving the brush to move back and forth linearly along a brushing path, and changing an orientation of the brush and a direction of the brushing path.

2. The toothbrush as claimed in claim 1, wherein:
the turning-and-moving mechanism includes:
    a transmission wheel assembly having:
      a transmission shaft rod connected to the drive motor and being capable of rotating along a transmission axis; and
      a driven wheel pivotally mounted on the brush end and engaged with the transmission shaft rod; the driven wheel rotating along a pivot axis; the driven wheel forming:
        a pivot pin deviating from the pivot axis; and
    a turning wheel pivotally mounted in the brush end of the shell and elastically engaged with an elastic protruding buckle of the inner side of the brush end; the turning wheel having:
      a guide groove laterally extending; and
      a mating hole connecting to the guide groove;
    wherein the brush connector is mounted in the guide groove and capable of moving along the brushing path, the brushing path is parallel with an extending direction of the guide groove; the brush connector has:
      a mating slot being perpendicular to the extending direction of the guide groove;
    wherein the pivot pin passes through the mating hole of the turning wheel and extends in the mating slot of the brush connector.

3. The toothbrush as claimed in claim 2, wherein the connecting component is connected to the side-brush heads via a pivot.

4. The toothbrush as claimed in claim 3, wherein a tip of the main-brush head is V-shaped, and lengths of the tufts of bristles of the side-brush heads gradually increase in a direction away from the main-brush head.

5. The toothbrush as claimed in claim 2, wherein the connecting component is connected to the side-brush heads via a ball joint.

6. The toothbrush as claimed in claim 5, wherein a tip of the main-brush head is V-shaped, and lengths of the tufts of bristles of the side-brush heads increase in a direction away from the main-brush head.

7. The toothbrush as claimed in claim 2, wherein a tip of the main-brush head is V-shaped, and lengths of the tufts of bristles of the side-brush heads gradually increase in a direction away from the main-brush head.

8. The toothbrush as claimed in claim 1, wherein the connecting component is connected to the side-brush heads via a pivot.

9. The toothbrush as claimed in claim 1, wherein the connecting component is connected to the side-brush heads via a ball joint.

10. The toothbrush as claimed in claim 1, wherein a tip of the main-brush head is V-shaped, and lengths of the tufts of bristles of the side-brush heads gradually increase in a direction away from the main-brush head.

\* \* \* \* \*